March 17, 1931.  H. W. CHRISTOPH  1,797,047
INSTRUMENT FOR MEASURING IRREGULARITIES OF THE SPINE
Filed Nov. 3, 1928  2 Sheets-Sheet 1
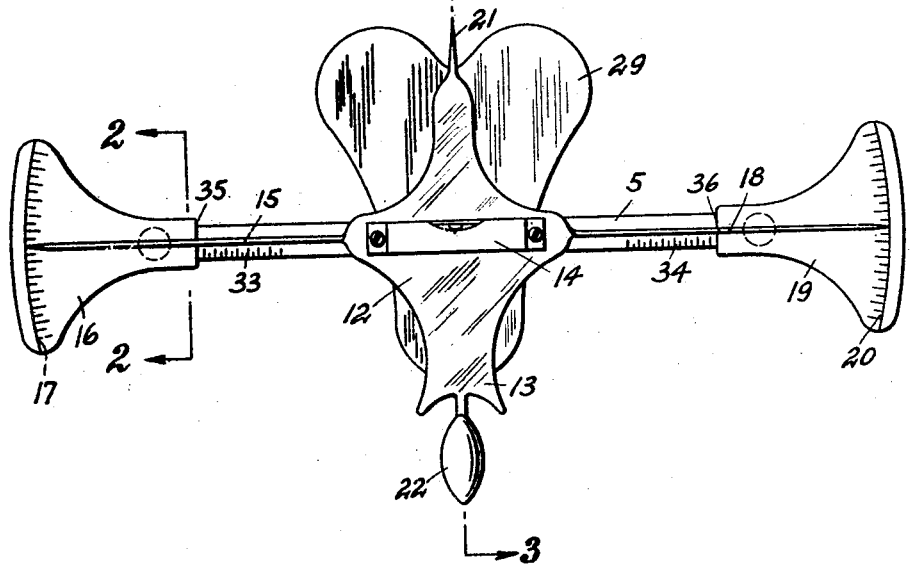
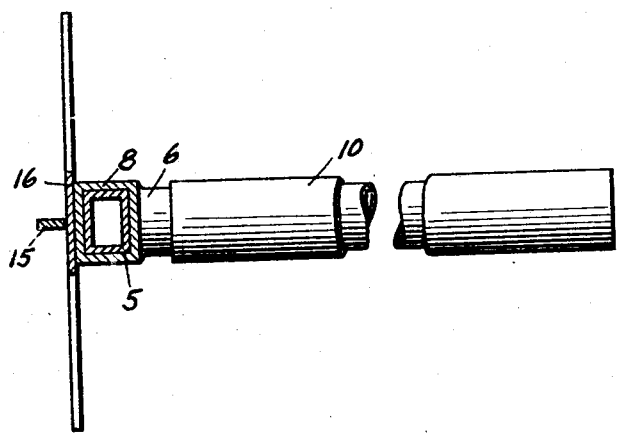
WITNESSES:
INVENTOR:
Hans W. Christoph,
BY
ATTORNEY.

March 17, 1931. H. W. CHRISTOPH 1,797,047
INSTRUMENT FOR MEASURING IRREGULARITIES OF THE SPINE
Filed Nov. 3, 1928 2 Sheets-Sheet 2
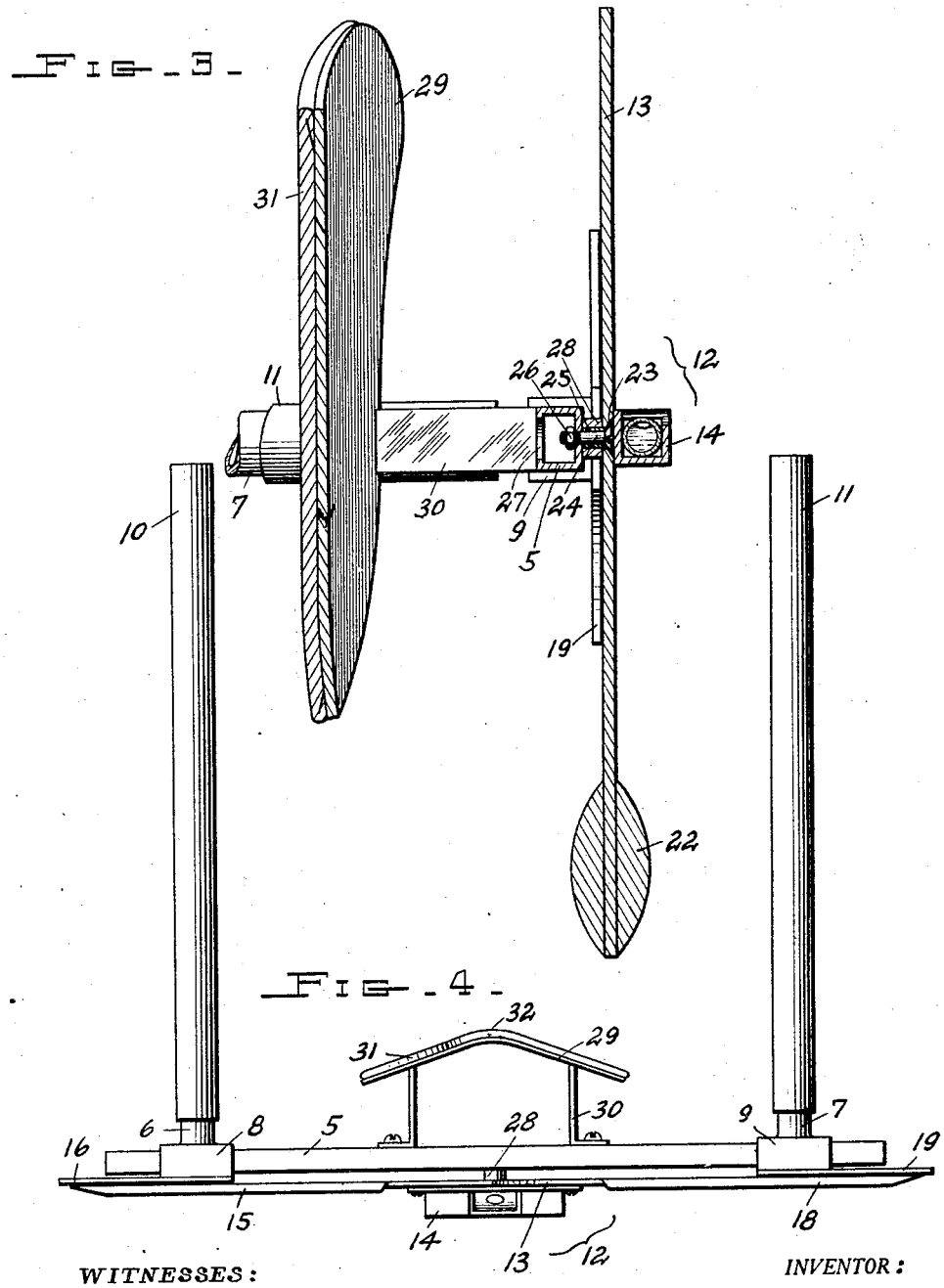

Patented Mar. 17, 1931

1,797,047

UNITED STATES PATENT OFFICE

HANS W. CHRISTOPH, OF PHILADELPHIA, PENNSYLVANIA, ASSIGNOR OF ONE-HALF TO AMSTERDAM BROTHERS, OF PHILADELPHIA, PENNSYLVANIA, A CORPORATION OF PENNSYLVANIA

INSTRUMENT FOR MEASURING IRREGULARITIES OF THE SPINE

Application filed November 3, 1928. Serial No. 317,006.

My invention relates to measuring instruments and more particularly to instruments for determining irregularities or deformities of the human body.

Persons having curvatures, deflections or other irregularities of the spinal column, often require braces or supports to assist in correcting such irregularities, to prevent the irregularity from becoming greater, or to assist the spine in carrying its load. In order to provide correctly fitted braces or supports, it is necessary to obtain exact measurements of the person and to determine the amount of curvature, deflection or other irregularity of the spine.

The object of this invention is to provide an instrument which will accurately determine such irregularity by measuring the difference between the elevations of a person's hips and which preferably has means for measuring the distance from the top of each hip to the centerline of the spinal column.

The invention resides in an instrument consisting of a frame, which is adapted to be placed upon the hips of a person who is standing, and means on the frame for measuring the difference between the elevations of the ends of the frame. In its present form, the instrument consists of a main member which is preferably a rectangular tube, sleeves slidably fitted on the main member and carrying arms which are preferably tubular, a scale fixed on one or both sleeves, a leveling element pivoted to the main member and having pointers overlapping the scales, and a back pad secured to the main member, as illustrated in the accompanying drawings, in which Figure 1 is an elevation of an instrument constructed according to my invention.

Figure 2 an enlarged section on line 2—2 on Figure 1, a part of the arm being broken away, Figure 3 an enlarged section on line 3—3 on Figure 1, a part of the arm being broken away, and Figure 4 a top plan view.

Referring now more in detail to the drawings, the main member 5 is preferably rectangular in cross-section and may consist of a piece of rectangular tubing in order to reduce the weight of the instrument while giving it the necessary strength. Arms 6 and 7 are mounted on the ends of the main member and, in order that the instrument may be adjusted to fit persons of different widths, the arms are preferably secured to sleeves 8 and 9 which have a neat sliding fit on the main member so that the arms may be moved toward and from each other but held against movement in any other direction relatively to each other and the main member. The arms may be made of cylindrical tubing and covered with tubes 10 and 11 of leather, rubber or the like.

A leveling element 12 is pivotally mounted on the main member and may consist of a plate 13, a spirit level 14 mounted on the plate, and a pointer 15 secured to or formed integral with the plate and overlapping a scale 16 which is fixed on sleeve 8 and provided with graduations 17. In order that the plate may be more evenly balanced and for the sake of greater accuracy, a pointer 18 may also be secured to or formed integral with plate 13 and overlap a scale 19 which is fixed on sleeve 9 and provided with graduations 20. Plate 13 may also be provided on its upper edge with a pointer 21 and on its lower edge with a weight 22; the weight tending to keep pointers 15 and 18 in a horizontal position and pointer 21 pointing vertically upward when the instrument is in use.

Plate 13 may be pivotally mounted on the main member by providing it with a countersunk hole 23 and extending a bolt 24 through this hole, through a tube 25 and through the wall of the main member. One end of the tube abuts the head of the bolt and its other end the main member, in which position it is rigidly secured by a nut 26 threaded onto the end of the bolt and tightened by passing a wrench through an aperture 27 formed in the opposite wall of the main member in alignment with the bolt. Plate 13 is spaced from the main member and held in alignment therewith by a separator 28 which is of such thickness that the plate may rotate freely on the tube without any unnecessary play.

In order that the instrument may be held firmly against the body of a person, it is preferably provided with a back pad 29 which may be secured to the main member by clips 30 and covered with leather or other material 31. The back pad is preferably bent outwardly at its center so that its centerline 32 may be positioned on the centerline of a person's spine.

In using the instrument, the person to be measured stands as squarely as possible upon both feet, the centerline of the back pad is placed upon the centerline of his spine, and sleeves 8 and 9 moved inwardly until arms 6 and 7 rest upon the tops of his hips. At this time, the distances from the centerline of his spine to the tops of his hips will be shown by those graduations on scales 33 and 34 which align with the edges 35 and 36 of scales 16 and 19, respectively. Weight 22 will swing the leveling element to an approximate horizontal position and, by adjusting it until the spirit level shows that pointers 15 and 18 are horizontal, the difference between the elevations of the person's hips may be read on either scale 16 or scale 19. The amount that one hip is higher than the other will determine the amount that the spine is out of vertical alignment.

While I have illustrated and described one embodiment of my invention, it will be understood that modifications may be made without departing from the spirit thereof and, hence, I do not wish to limit myself to the precise construction set forth but consider that I am at liberty to make such changes and alterations as fairly come within the scope of the appended claims.

I claim:—

1. An instrument, for measuring irregularities of the spine, including a main member, hip contacting means mounted on the main member, a spine paralleling member carried by the main member, a scale carried by the hip contacting means, and leveling means on the main member coacting with the scale.

2. An instrument, for measuring irregularities of the spine, including a main member, a spine paralleling member on the main member, hip contacting means mounted on the main member, a scale carried by the hip contacting means, and leveling means on the main member coacting with the scale.

3. An instrument, for measuring irregularities of the spine, including a main member, hip contacting means mounted on the main member, a scale carried by the hip contacting means, a leveling member pivoted on the main member and coacting with the scale, a weight on the leveling means for holding it approximately in a horizontal position, and auxiliary means on the leveling member to determine accurate horizontality.

4. An instrument, for measuring irregularities of the spine, including a main member, a back pad secured to the main member and spaced therefrom, hip contacting means mounted on the main member, a scale carried by the hip contacting means, leveling means pivoted on the main member, and a pointer on the leveling means coacting with the scale.

5. An instrument, for measuring irregularities of the spine, including a main member, a sleeve slidable on each end of the main member, an arm secured to one side of each sleeve, a scale secured to the other side of each sleeve, and leveling means pivoted on the main member and coacting with the scales.

6. An instrument, for measuring irregularities of the spine, including a main member, a back pad secured to the main member and spaced therefrom, a sleeve slidable on each end of the main member, an arm secured to one side of each sleeve, a scale secured to the other side of each sleeve, and leveling means pivoted on the main member and coacting with the scales.

7. An instrument, for measuring irregularities of the spine, including a main member which is rectangular in cross-section, a sleeve slidably fitted on each end of the main member, an arm secured to one side of each sleeve, a scale secured to the other side of each sleeve, and leveling means pivoted on the main member and coacting with the scales.

8. An instrument, for measuring irregularities of the spine, including a main member which is rectangular in cross-section, a sleeve slidably fitted on each end of the main member, an arm secured to one side of each sleeve, a scale secured to the other side of each sleeve, a plate pivoted on the main member, a level on the plate, pointers on the plate for coacting with the scales, and a weight for holding the pointers in a horizontal plane.

In testimony whereof I have signed my name to this specification.

HANS W. CHRISTOPH.